(12) United States Patent
Swanson

(10) Patent No.: US 6,640,162 B1
(45) Date of Patent: Oct. 28, 2003

(54) CONTROL METHOD UTILIZING DIRECTIONALLY BASED CONTROL CONSTRAINTS

(76) Inventor: Eric Swanson, 229 E. Third St., Moorestown, NJ (US) 08057

( * ) Notice: Subject to any disclaimer, the term of this patent is extended or adjusted under 35 U.S.C. 154(b) by 0 days.

(21) Appl. No.: 09/551,984

(22) Filed: Apr. 15, 2000

(51) Int. Cl.$^7$ .............................................. G05B 19/02
(52) U.S. Cl. ........................ 700/275; 700/56; 318/571
(58) Field of Search .............................. 700/56, 62, 63, 700/64, 275, 276, 282; 318/569, 571, 572, 567, 600

(56) References Cited

U.S. PATENT DOCUMENTS

| | | | |
|---|---|---|---|
| 3,979,922 A | | 9/1976 | Shavit |
| 4,462,539 A | | 7/1984 | Gilson |
| 4,481,451 A | * | 11/1984 | Kautz et al. ................ 318/628 |
| 4,955,305 A | * | 9/1990 | Garnier et al. ................ 700/56 |
| 5,389,864 A | * | 2/1995 | Tryan et al. ................ 318/562 |
| 5,847,530 A | * | 12/1998 | Hill ............................ 318/599 |
| 6,073,689 A | * | 6/2000 | Mizuno ....................... 165/201 |
| 6,272,401 B1 | * | 8/2001 | Boger et al. ................ 700/282 |
| 6,512,960 B1 | * | 1/2003 | Schulz ........................ 700/56 |

OTHER PUBLICATIONS

Johnson Control Inc. HVAC PRO For Windows User's Manual, Document No. 637.5, Issue Date Jul. 1995 Section "VAV Terminal Control Applications", p. 35.*

Landis & GYR Power Inc., Document No. 128–1944 Revision 2, Feb. 1995 "System 600 Constant Volume Controller—Electric Output Manual", pp. 3–7.*

"Research Finds Economizer Plus Demand Control Ventilation Delivers Highest Energy Savings", Honeywell Document 63–9058, dated Jun. 1998, pp. 1–6.*

* cited by examiner

*Primary Examiner*—Albert W. Paladini
*Assistant Examiner*—Paul Rodriguez

(57) ABSTRACT

An improved control method that constrains the operation of a manipulator in a control system is provided. Modifying a conventional control system to conform to this new method requires the selection of a preferred or desired direction of adjustment for the manipulator and the selection of a reset value for the manipulator. The conventional control system, which normally adjusts the manipulator as necessary to achieve a desired value for a system variable, is constrained by this new method so that the system variable achieves the desired value as a final or direct result of using manipulator adjustments that are in the selected desired direction of adjustment.

7 Claims, 5 Drawing Sheets

CONTROL METHOD UTILIZING DIRECTIONALLY BASED CONTROL CONSTRAINTS

BACKGROUND

1. Field of Invention

This invention relates to controls that are commonly used to position and control devices in various applications.

2. Description of Prior Art

There are many actuator applications, including many heating, ventilating, and air conditioning (HVAC) applications, where accurate, repeatable positioning of a device or an actuator is required. One common, simple, durable, inexpensive type of electrically driven actuator is often referred to as an incremental control type actuator. In this patent application the term "incremental control type actuator" will be used to refer to any device that is controlled based on the duration of the control signal. Incremental control type actuators often produce movement in two distinct directions based on a control signal that has two parts. One signal causes the actuator to drive in one direction, another signal causes the actuator to drive in another direction, and the absence of either signal causes the actuator to remain in the present position. An incremental control type actuator is distinct from other actuators that use a variable control signal that corresponds to a particular control value or position. Actuators that are not incrementally controlled operate based on some variable type control signal, such as variable voltage, variable current, modulated pulse width, or variable pneumatic pressure. Incremental control type actuators are often referred to by the following names:

1) floating control type actuator
2) floating point type actuator
3) position adjust type actuator
4) tri-state control type actuator
5) series 60 type actuator
6) three-wire SPDT type actuator Although this new control method can be successfully applied to other incrementally controlled devices or final control elements (in addition to what is commonly referred to as an actuator) this discussion will focus on common actuators. There are many incremental control type actuators in use today, but the available control options are very limited. Due to the current control methods being applied to incremental control type actuators, correcting or modifying a control system that uses an incremental control type actuator often requires installing additional equipment, such as position sensors, or replacing an incremental control type actuator with an actuator that can accept another type of control signal. When an incremental control type actuator is replaced with an actuator of a different type then the controller hardware often must be changed as well, since incremental control type actuators, unlike most other types of actuators, can be controlled by inexpensive controllers that do not have analog outputs.

There is no satisfactory position control method that can be applied to incremental control type actuators without requiring the use of position switches or position sensors. Current positioning methods applied to incremental control type actuators need position switches or position sensors to operate accurately and repeatably. Because of the current methods used to position incremental type actuators control manufacturers strongly recommend the use of closed loop position control systems (systems with position feedback) anytime that the position of the final control element is of any importance. Using a position sensing devices adds to the final installed cost of any system. Beside the cost of purchasing the sensing device, there are also additional costs to install, calibrate, and setup the position sensing device. Some position switch installations are complicated and require a skilled installer. One example of closed loop position control applied to an HVAC economizer control apparatus can be seen in U.S. Pat. No. 4,462,539. It is very desirable to have a position control method that does not require the additional expense and complexity associated with closed loop systems.

One common example of open loop position control (position control without position feedback) in the HVAC area is a simple economizer controller. The damper control portion of a simple economizer controller is basically just an open loop position controller that functions to achieve the following.

1) The damper actuator is commanded fully closed when the associated space thermostat is not calling for the fan to run.
2) The damper actuator is commanded to a predetermined, adjustable position determined by a potentiometer when one of the following conditions occur.
   a) The thermostat is calling for the fan to run and the outside air is too hot to be used for cooling.
   b) The thermostat is calling for the fan to run and the thermostat is not calling for cooling.
3) The damper actuator is commanded to the fully open position when the thermostat is calling for the fan to run and the outside air is cool enough to be used for cooling and the thermostat is calling for cooling.

Economizer controls were developed by Honeywell, Incorporated after U.S. Pat. No. 3,979,922 was granted. The open loop damper control method outlined above is widely used as part of many economizer packages that save energy by using outside air to cool instead of relying solely on mechanical cooling. While the damper control method described above is simple and effective, all of the open loop versions require the use of an actuator that is positioned based on a modulating control signal. The open loop positioning method used in Honeywell's economizer controls requires the use of a modulating motor that operates based on a variable resistance or variable voltage signal. There is no simple open loop control method compatible with incremental control type actuators.

Incremental control type actuator are often used for two-position control where an actuator is driven to either of two extreme positions by a two-position signal. Incremental control type actuators are also used for a form of modulating control. The basic reasoning behind using an incremental control type actuator for modulating control is to use a simple controller and an associated actuator to produce a gradual, continuous action in either of two directions which continues until the controlled variable reaches the setpoint value, or the actuator reaches its travel limit. Once the setpoint is reached, the controller no longer drives the actuator and it remains in its last position until a new position is required.

The most common way that incremental control type actuators are used in heating, ventilating, and air conditioning (HVAC) systems is for a microprocessor based controller to position an actuator and its associated damper or valve as necessary to maintain the setpoint of a controlled variable. The controlled variable is often temperature or pressure. In these applications, although the actuator position is being directly manipulated, the position is not the variable being controlled. In applications where the damper or valve position is the controlled variable, a position sensor functions as a feedback device to keep track of the actuators position and the control method is classified as a closed-loop control method.

Some current open-loop control strategies that use an incremental control type actuator for temperature or pressure position control also use a microprocessor based controller to keep track of the actuator's position. The idea is that since the actuator's stroke time is known (stroke time is the time required for the actuator to move from one extreme position to another extreme position), the actuator's position can be known if the initial position is known and the time spent opening and closing is known. If an incremental control type actuator has a stroke time of 60 seconds, and an initial position of fully closed, and the actuator is driven toward the open position for 30 seconds then the controlled element is assumed to be 50% open. If the actuator is then driven toward the closed position for 15 seconds then the controlled element is assumed to be 25% open. Theoretically a microprocessor can keep performing these calculations with every movement and always know the position of the associated final control element. The problem; however, is that there are many ways for error to be introduced.

(a) Most incremental control type actuators have a stroke time that is dependent on the torque load applied to the actuator.

(b) Most actuators that operate against a mechanical bias (like spring return actuators) move in one direction faster than they move in the other direction.

(c) Mechanical linkages between an actuator and a controlled element often have torque requirements that vary with position.

(d) Small delays in switching accumulate with each change in position.

(e) Mechanical linkages between an actuator and a controlled element often have hysterisis which is not accounted for in the calculations.

(f) The actual stroke time for a controlled element will be less than the rated stroke time for the actuator whenever the damper does not require the actuator's full range of motion to move from the fully closed position to the fully open position.

All of these inconsistencies introduce error into the microprocessor's calculation of position of the controlled element. These errors continue to accumulate and can quickly lead to serious position errors. A common correction routine to limit these errors uses a microprocessor to command the actuator to the fully closed position for a period of time long enough to make sure that the controlled element has had time to actually close, then resetting the calculated position to the fully closed position. This error correction typically is required every 24 hours, even in the best situations. Some microprocessors are programmed to randomly execute the correction routine. Others execute the correction routine daily at a scheduled "non-critical" time. Others (as described in Johnson Controls, Inc. HVAC PRO for Windows User's Manual, Document Number 637.5, Issue Date Jul. 1995, Section: "VAV Terminal Control Applications", page 35) execute the correction routine when the actuator position is very near an extreme position. Others (as described in Landis & Gyr Powers, Inc., Document Number 125-1944, Revision 2, February 1995 "System 600 Constant Volume Controller-Electric Output Owner's Manual", page 3–7) execute a correction routine when the calculated actuator position is so far from the actual position that one or more system sensors could only be correct if the calculated actuator position is incorrect. Many applications do not have a daily scheduled "non-critical" time. Many applications cannot afford to randomly lose control. Many applications do not require the actuator to reach an extreme position often enough to correct for the error that has accumulated. Many applications cannot tolerate position errors. Many applications cannot wait for that rare instance when an actuator's calculated position, like the proverbial stopped clock, agrees with reality. There is a need for a simple open loop position control method that can be applied to incremental control type actuators without the need for any random or periodic correction routines.

A common means for eliminating the need for the correction routine and its associated damper closure is to introduce damper position feedback to the controller. A position switch or variable position signaling device can be physically mounted on the actuator or the damper and the position signal can be incorporated into the microprocessor's control program. The problem with using position switches or position signaling devices is with the additional cost, installation time and skill required to properly set up each additional device.

Because of the inherent disadvantages (some of which are discussed above) of current control methods applied to incremental control type actuators, many installed systems operate poorly. In the field of HVAC, for example, many outside air dampers controlled by incremental control type actuators fail to admit the design quantity of fresh air into the units they serve. Failure to admit enough air to meet ventilation design standards can lead to unhealthy conditions for occupants and damaging conditions for materials. Poor control leading to excessive use of outside air wastes energy and money, since outside air usually requires heating, cooling, humidification, or de-humidification. Many poorly operating systems, especially in schools and public buildings, are never corrected because correcting a poorly designed control systems is expensive. Attempting to correct the problem often involves hardware changes (additional switches, new actuator, new controller, new or additional wiring), software changes (new or revised microprocessor programming), and associated labor costs. The problems associated with changing an open loop system to a closed loop system were discussed above. Even simple attempts to improve operation, such as the use of a scheduled correction routine (as described above) require software changes (new or revised microprocessor programming) and often hardware changes (since many inexpensive microprocessors used in HVAC applications do not have the ability to run time schedules). There is a need for a new control method that can improve operation through implementation of a software solution (new or revised programming), without requiring any costly hardware or wiring changes, to correct operating problems on existing systems.

In order to satisfy ventilation requirements, many HVAC damper control strategies incorporate a minimum outside air damper position that corresponds to a minimum acceptable flow rate of outside air. In an attempt to conserve energy and save money, some systems are designed to have more than one "minimum" damper position. A good description of these systems is found in a paper (Honeywell Document 63-9058) published by Honeywell, Inc. in June 1998. In these systems each predetermined "minimum" position corresponds to a minimum acceptable ventilation level which is determined by factors such as occupancy rates, air quality, or other factors. While existing closed loop control methods can be applied to incremental control type damper actuators with multiple "minimum" positions used as part of an economizer control strategy, these existing methods require the use of multiple position switches or a position sensor. The disadvantages of current closed loop control methods applied to incremental control type actuator have been described above. Energy and cost savings that could be accomplished through utilizing multiple "minimum" outside air positions are usually not taken advantage of because of the cost and complications involved with the hardware and software changes required to revise the control system. There is a need for a control method that can be applied to incremental control type actuators that makes it possible to add one or more additional "minimum" positions to a damper control system without requiring both hardware and software changes to the system. In order to make it practical for the owners of HVAC systems to convert their existing control systems to utilize multiple "minimum" damper positions there needs to be a control method that allows the conversion to take place as a "software only" change.

Control methods applied to incremental control type actuators include closed loop control methods (incorporating feedback from the controlled variable into the control system) and open loop control methods (not incorporating feedback from the controlled variable into the control system). Existing control methods applied to incremental control type actuators suffer from a number of disadvantages including the following.

(a) Existing closed loop control methods applied to incremental control type actuators require some type of input related to the controlled variable. This input must come from a sensing device. Common devices used include position switches and position sensors. The problem with using position switches or position sensing devices is with the additional cost, installation time and skill required to properly set up each device.

(b) Existing open loop control methods applied to incremental control type actuators require random or periodic correction routines to reduce position errors created by accumulating differences between calculated and actual positions. The required random or periodic correction routines are inconvenient and in many cases totally unacceptable.

(c) Existing open loop control methods applied to incremental control type actuators require the use of microprocessor based controls. Microprocessor based controls tend to be more expensive and have more restrictive operating conditions than non-microprocessor based electrical circuits. Many microprocessor based controls cannot be mounted in an area where the ambient temperature might fall below 32° F. (0° C.). It is often desirable to mount damper controls near the dampers. For a rooftop air handling unit, this means mounting the controls in an area exposed to outside air temperatures which can vary between extreme hot and extreme cold conditions.

(d) Existing open loop control methods applied to incremental control type actuators do not operate based on signals generated from a conventional thermostat or an interface device that operates similarly. The 24 volt on/off signals produced by conventional thermostats are not used by existing control methods to position incremental control type actuators to predetermined intermediate positions located between the extreme open and the extreme closed positions.

(e) Existing open loop control methods applied to incremental control type actuators do not operate based on signals generated by switches and contacts. Contact closure signals are not used by current control methods to position incremental control type actuators to predetermined intermediate positions located between the extreme open and the extreme closed positions.

(f) Existing control methods that can be applied to incremental control type actuators are often complicated and ineffective causing many designers to change from incremental control type actuators to other types of actuators that are more expensive but that can be effectively controlled by existing control methods. Because of their low cost, simplicity, durability, and availability, it is desirable to use incremental control type actuators in open loop position control systems.

(g) Improving the operation of a previously installed control system that is based on existing control methods applied to incremental control type actuators is time consuming, difficult, and expensive due to required hardware and software changes and the labor and materials involved.

(h) Changing the operation of a previously installed HVAC control system to utilize multiple "minimum" outside air damper positions is time consuming, difficult, and expensive due to required hardware and software changes and the labor and materials involved.

(i) Existing methods applied to incremental control type actuators in HVAC applications do not provide a way to correct damper actuator position errors by closing the damper only after periods of over-ventilation.

(j) Existing actuator control methods are not conducive to wireless control and positioning systems. Existing control methods applied to non-incrementally controlled actuators result in expensive systems. Existing control methods applied to incremental control type actuators lead to ineffective systems.

Objects and Advantages

Accordingly, several objects and advantages of my new control method are:

(a) to provide a control method that eliminates the need for position switches or position sensors currently required by other control methods used to control incremental control type actuators;

(b) to provide a control method that eliminates the need for moving an actuator to an undesirable position during a random or scheduled correction routine as currently required by existing open loop control methods used to control of incremental control type actuators;

(c) to provide a control method that is simple enough to be executed without the required use of microprocessor based controls;

(d) to provide a control method that can use a conventional thermostat or a similar interface to initiate positioning of an incremental control type actuator to intermediate as well as extreme positions;

(e) to provide a control method that can use switches and contact closure devices to initiate positioning of an incremental control type actuator to intermediate as well as extreme actuator positions;

(f) to provide a control method that decreases product cost by allowing incremental control type actuators to be effectively used were they could not be effectively used before;

(g) to provide a control method that can be simply and inexpensively applied to poorly operating HVAC control systems to improve operation and save energy and money without requiring hardware or equipment changes;

(h) to provide a control method that makes it possible save energy and money by adding an additional "minimum" outside air damper position to an existing HVAC system only by revising the software logic that controls the system—without any hardware or equipment changes;

(i) to provide a control method that can be applied to incremental control type actuators in HVAC applications to correct damper actuator position errors by closing the damper only after periods of over-ventilation.

(j) to provide a control method that is conducive to wireless control and positioning applications;

(k) to provide a control method that increases product reliability by allowing incremental control type actuators to be effectively used were they could not be effectively used before;

(l) to provide a control method that can be used to accurately position an incremental control type actuator regardless of whether an actuator's speed is a function of an applied torque load;

(m) to provide a control method that can be used to accurately position incremental control type actuators regardless of whether an actuator's speed is a function of an actuator's position; and (n) to provide a control method that can be used to accurately position an incremental control type actuator regardless of whether the actuator's speed is a function of the direction which an actuator moves.

Further objects and advantages are to provide a simple, inexpensive method of positioning and controlling that allows any incrementally controlled actuator, device or manipulator to be accurately and repeatable controlled or positioned without the need for feedback devices or unacceptable random, periodic, or position based interruptions in operation to correct for control errors. Still further objects and advantages will become apparent from a consideration of the ensuing description and drawings.

DRAWING FIGURES

Figure 1:
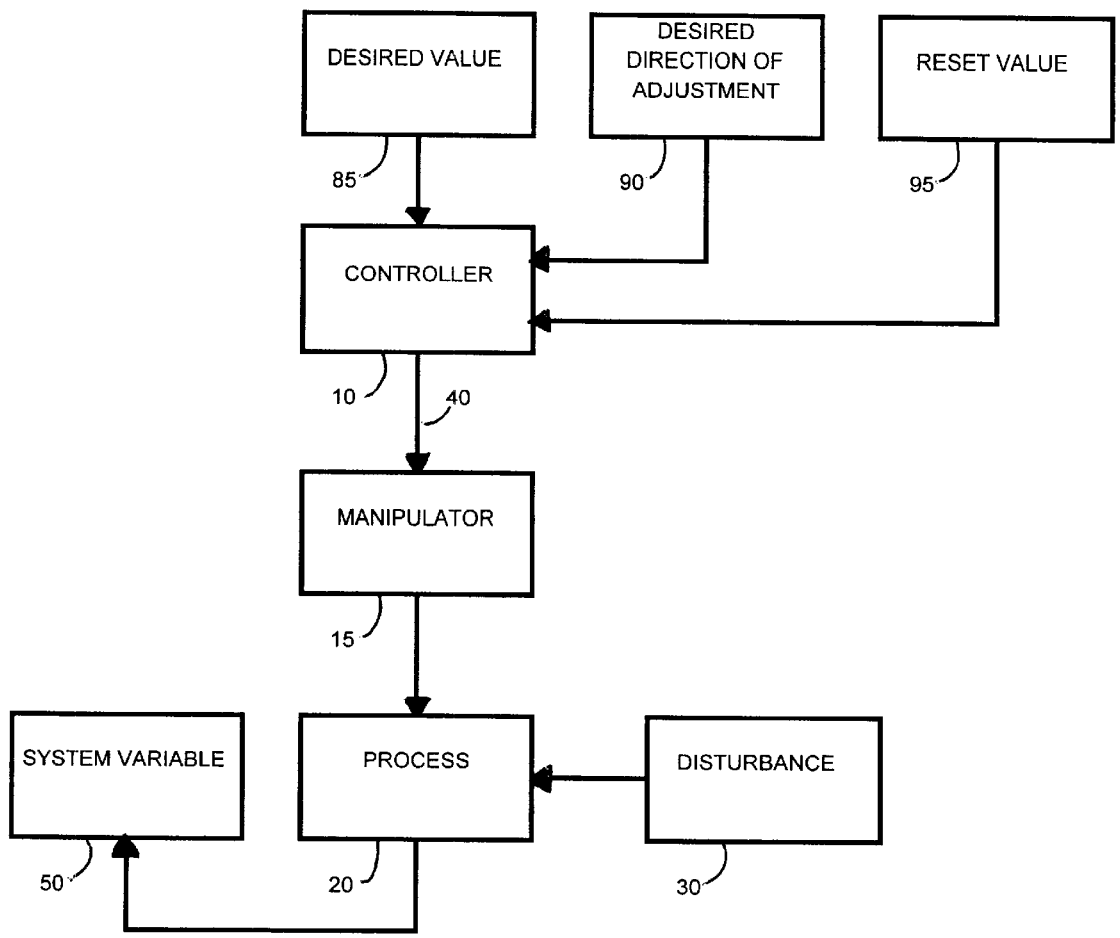
FIG. 1 shows a block diagram of an open loop control system controlled by a controller that operates according to the new method being claimed.

REFERENCE NUMERALS IN DRAWINGS 10 controller
15 manipulator
20 process
25 sensor
30 disturbance
40 control signal
50 system variable
55 feedback signal
85 desired value
90 desired direction of adjustment
95 reset value
100 value selection block
105 direction selection block
110 direction decision block
115 reset value selection block
120 control action block
125 reset action block
130 adjustment decision block

SUMMARY

In accordance with the new control method a manipulator adjusts so that a system variable achieves a desired value as a result of said manipulator adjusting in a desired direction of adjustment.

Description of FIG. 1

A typical embodiment of the new control method being claimed is shown in FIG. 1 where a block diagram represents the parts of a control system. An actuator, final control element, controlled device, or manipulator 15 receives a control signal 40 from a controller 10. Controller 10 receives a setpoint or desired value 85 for a system variable 50. Controller 10 receives a preferred direction of final manipulation or desired direction of adjustment 90 for manipulator 15. Controller 10 receives a control limit value, temporary manipulator target value, or reset value 95 for manipulator 15. Reset value 95 represents a value of manipulator 15 from which all desirable values of manipulator 15 can be achieved as a result of manipulator 15 adjusting in desired direction of adjustment 90. Controller 10 adjusts manipulator 15 according to the new control method outlined in FIG. 2 to effect a process 20 which is effected by a disturbance 30.

Figure 2:
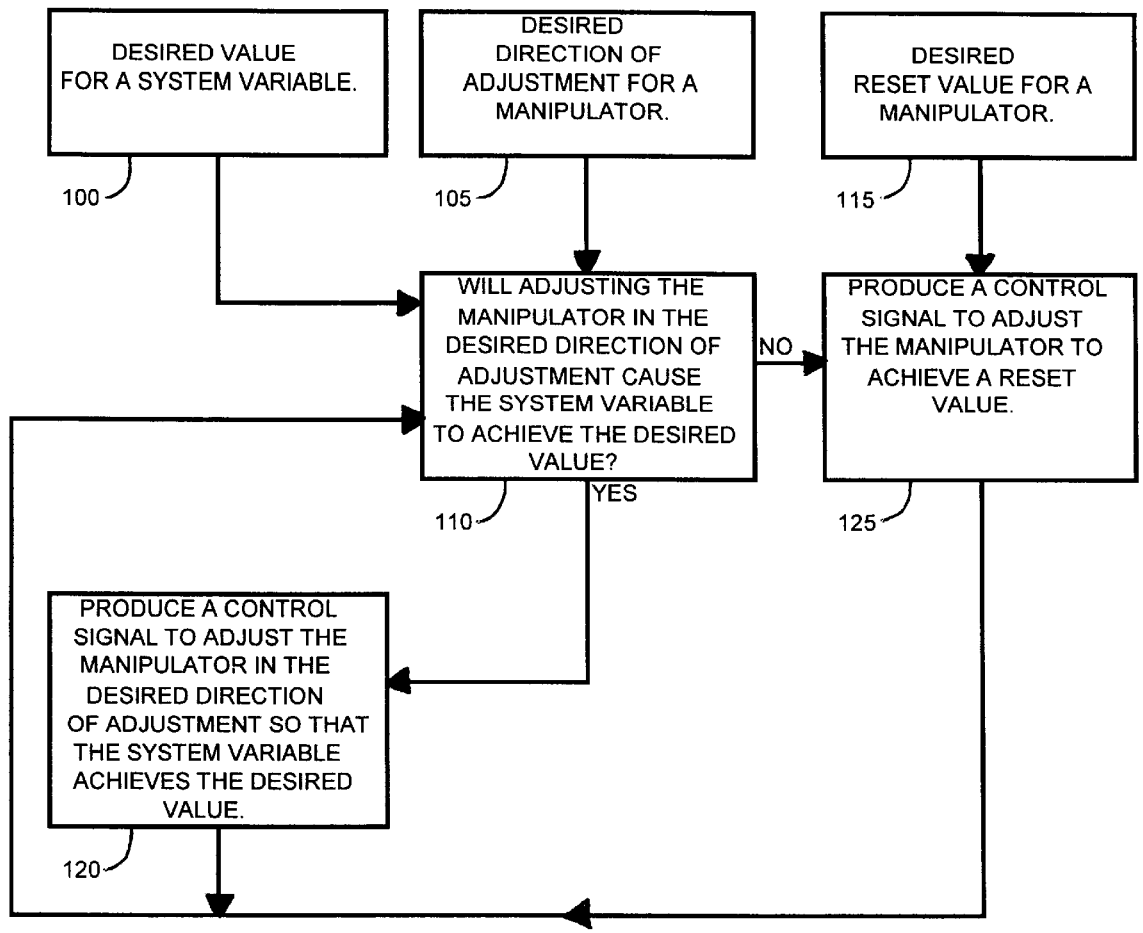
FIG. 2 shows a flow chart of the operation of a controller that is consistent with the new control method being claimed.

Description of FIG. 2

FIG. 2 is a flow chart that describes the basic operation of controller 10 that is consistent with the new control method. A direction decision block 110 uses information from a value selection block 100 and a direction selection block 105 to determine whether to execute a control action block 120 or a reset action block 125. The reset action block 125 executes according to information from a reset value selection block 115.

Operation of the Control System Shown in FIG. 1 Operation According to the Metnod Shown in FIG. 2

The controller 10 in FIG. 1 operates according to the new control method shown in FIG. 2. The following is a description of the control system shown in FIG. 1 operating according to the new control method shown in FIG. 2. Desired value 85 and desired direction of adjustment 90 are used by controller 10 to determine control signal 40. If desired value 85 cannot be achieved as a result of manipulator 15 adjusting in desired direction of adjustment 90 then controller 10 produces control signal 40 to adjust manipulator 15 to achieve reset value 95. If desired value 85 can be achieved as a result of manipulator 15 adjusting in the desired direction of adjustment 90 then controller 10 produces control signal 40 to adjust manipulator 15 so that desired value 85 is achieved. When the new control method as outlined in FIG. 2 is applied to the control system shown in FIG. 1, as described above, then system variable 50 achieves desired value 85 as a result of manipulator 15 adjusting in the desired direction of adjustment 90.

Figure 3:
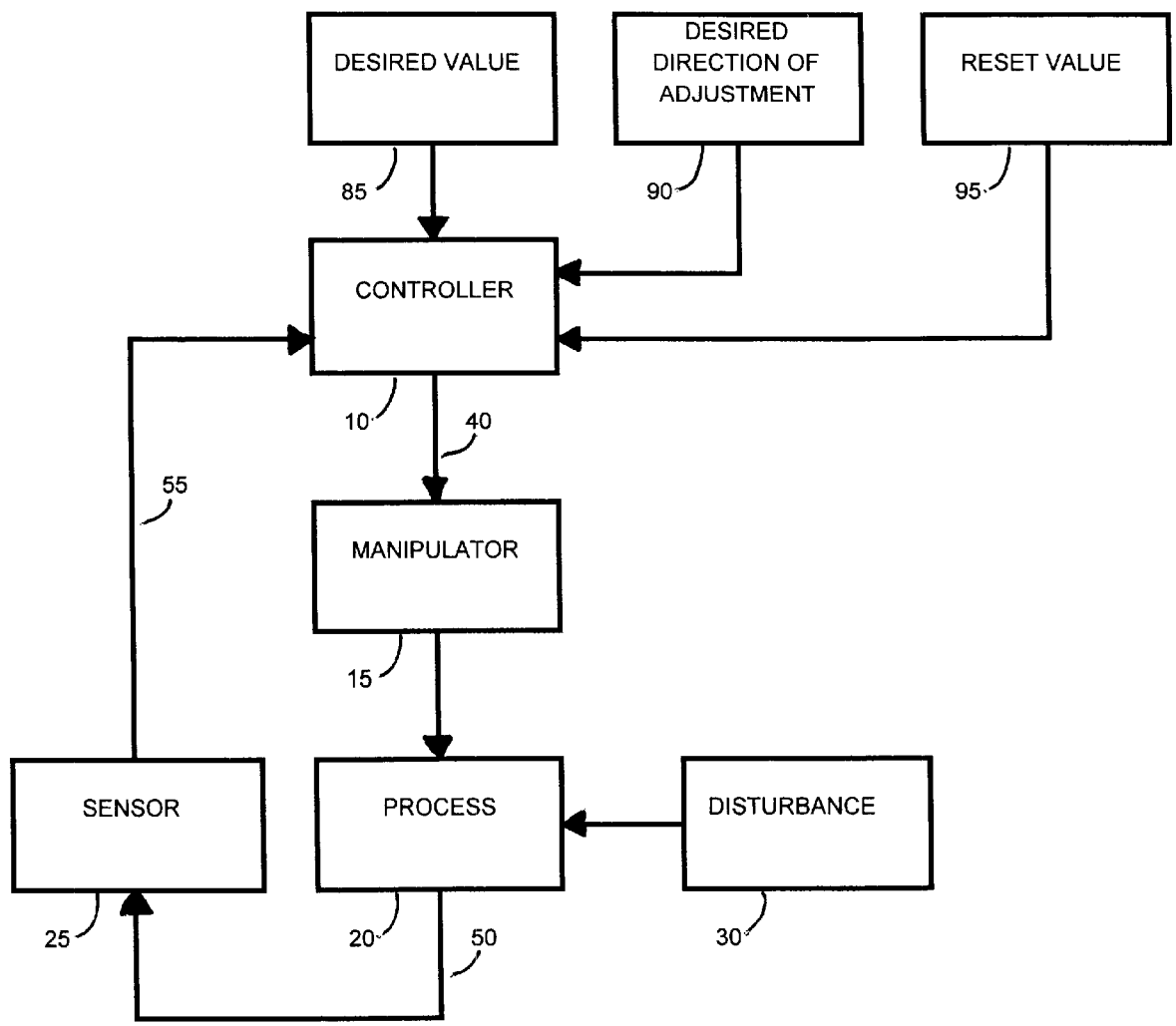
FIG. 3 shows a block diagram of a closed loop control system controlled by a controller that operates according to the new method being claimed where the system variable is a process variable .

Description of FIG. 3

A typical embodiment of the new control method being claimed is shown in FIG. 3 where a block diagram represents the parts of a control system. Manipulator 15 receives control signal 40 from controller 10. Controller 10 receives desired value 85 for system variable 50. Controller 10 receives desired direction of adjustment 90 for manipulator 15. Controller 10 receives a reset value 95 for manipulator 15. Reset value 95 represents a value of manipulator 15 from which all desirable values of manipulator 15 can be achieved as a result of manipulator 15 adjusting in the desired direction of adjustment 90. Controller 10 also receives a feedback signal 55 from a sensor 25 which is based on system variable 50. Controller 10 adjusts manipulator 15 according to the new control method to effect a process 20 which is also effected by disturbance 30.

Operation of the Control System Shown in FIG. 3 Operation According to the Method Shown in FIG. 2

The controller 10 in FIG. 3 operates according to the new control method shown in FIG. 2. The following is a description of the control system shown in FIG. 3 operating according to the new control method shown in FIG. 2. Desired value 85 and desired direction of adjustment 90 are used by controller 10 to determine control signal 40. If the desired value 85 cannot be achieved as a result of manipulator 15 adjusting in the desired direction of adjustment 90 then controller 10 produces control signal 40 to adjust manipulator 15 to achieve the reset value 95. If the desired value 85 can be achieved as a result of manipulator 15 adjusting in the desired direction of adjustment 90 then controller 10 produces control signal 40 to adjust manipulator 15 so that the desired value 85 is achieved. Controller 10 uses feedback signal 55 to determine the value of system variable 50. When the new control method as outlined in FIG. 2 is applied to the control system shown in FIG. 3, as described above, then the system variable 50 achieves the desired value 85 as a result of the manipulator 15 adjusting in the desired direction of adjustment 90.

Figure 4:
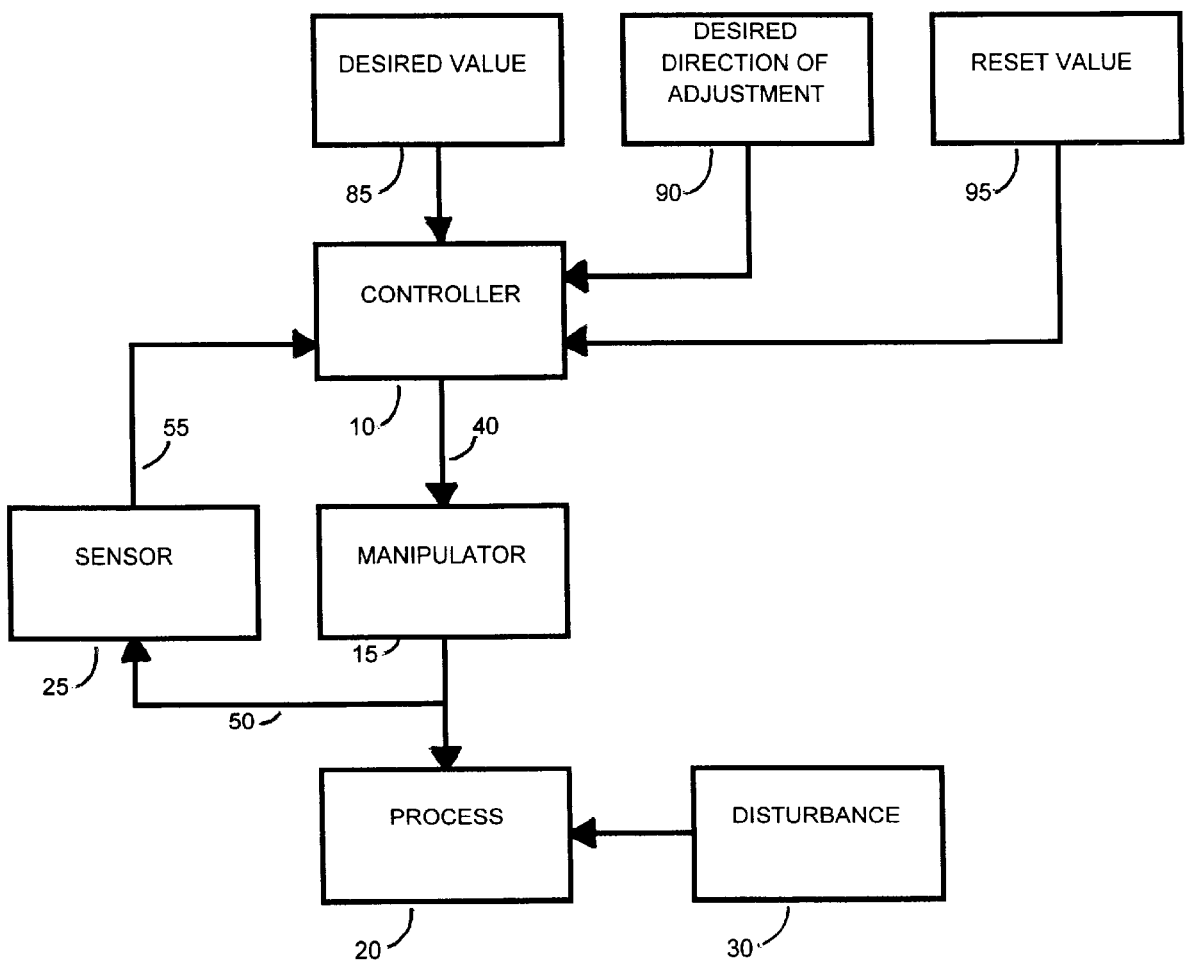
FIG. 4 shows a block diagram of a closed loop control system controlled by a controller that operates according to the new method being claimed where the system variable is a manipulator variable.

Description of FIG. 4

A typical embodiment of the new control method being claimed is shown in FIG. 4 where a block diagram represents the parts of a control system. Manipulator 15 receives control signal 40 from controller 10. Controller 10 receives desired value 85 for system variable 50 which is, in this example, a manipulator variable—such as the manipulator's position. Controller 10 receives the desired direction of adjustment 90 for manipulator 15. Controller 10 receives reset value 95 for manipulator 15. Reset value 95 represents a value of manipulator 15 from which all desirable values of manipulator 15 can be achieved as a result of manipulator 15 adjusting in the desired direction of adjustment 90. Controller 10 also receives a feedback signal 55 from a sensor 25 which is based on system variable 50. Controller 10 adjusts manipulator 15 according to the new control method to effect process 20 which is also effected by disturbance 30.

Operation of the Control System Shown in FIG. 4 Operation According to the Method Shown in FIG. 2

The controller 10 in FIG. 4 operates according to the new control method shown in FIG. 2. The following is a description of the control system shown in FIG. 4 operating according to the new control method shown in FIG. 2. Desired value 85 and the desired direction of adjustment 90 are used by controller 10 to determine control signal 40. If the desired value 85 cannot be achieved as a result of manipulator 15 adjusting in the desired direction of adjustment 90 then controller 10 produces control signal 40 to adjust manipulator 15 to achieve the reset value 95. If desired value 85 can be achieved as a result of manipulator 15 adjusting in the desired direction of adjustment 90 then controller 10 produces control signal 40 to adjust manipulator 15 so that desired value 85 is achieved. Controller 10 uses feedback signal 55 to determine the value of system variable 50. When the new control method as outlined in FIG. 2 is applied to the control system shown in FIG. 4, as described above, then system variable 50 achieves desired value 85 as a result of manipulator 15 adjusting in the desired direction of adjustment 90.

Figure 5:
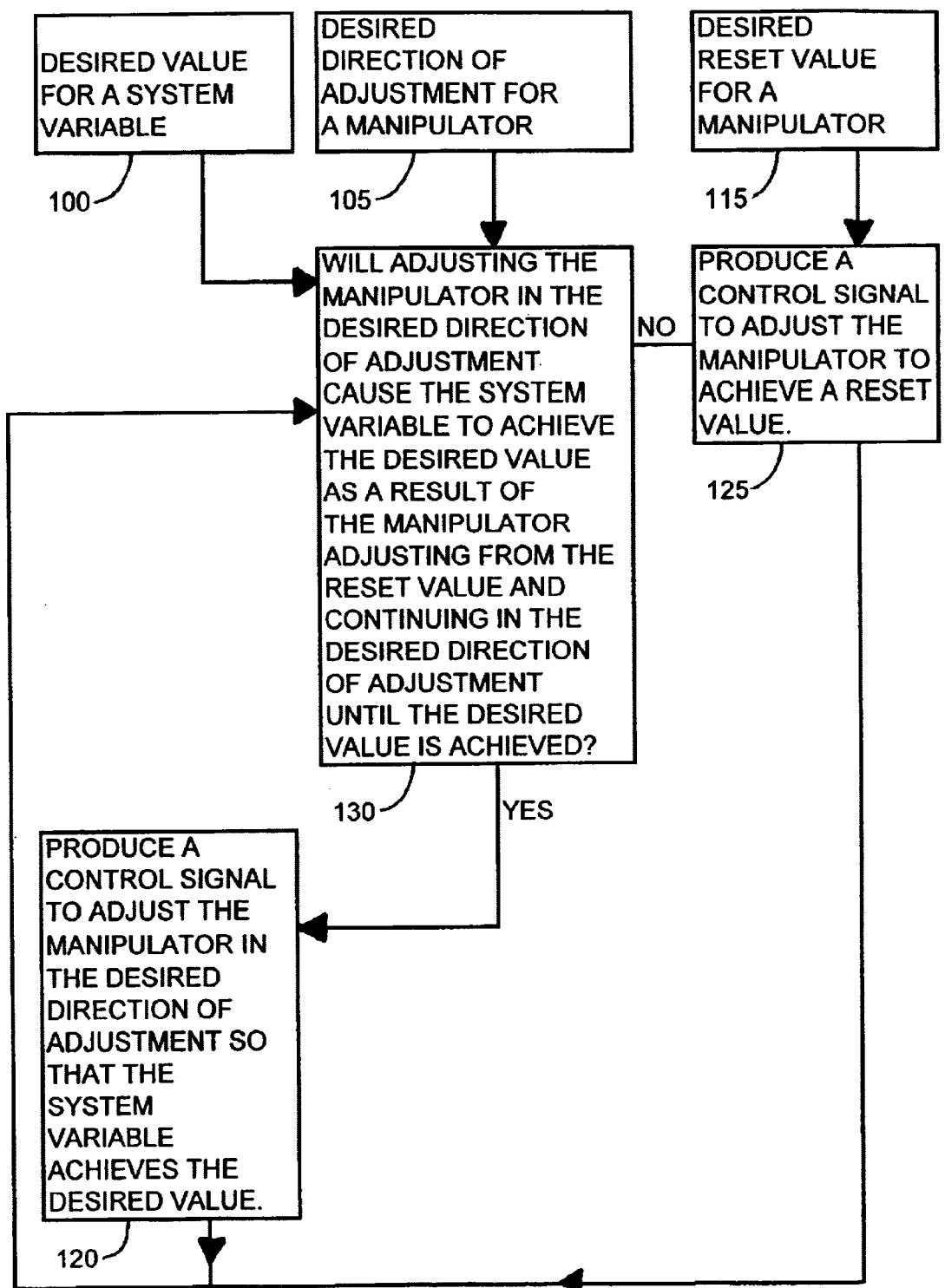
FIG. 5 shows a flow chart of the operation of a controller that is consistent with the new control method being claimed but where adjustments are more restricted than in FIG. 2.

Description of FIG. 5

FIG. 5 is a flow chart that describes the operation of controller 10 that is consistent with the new control method. An adjustment decision block 130 uses information from a value selection block 100 and a direction selection block 105 to determine whether to execute a control action block 120 or a reset action block 125. The reset action block 125 executes according to information from a reset value selection block 115.

Operation of the Control System Shown in FIG. 1 Operation According to the Method Shown in FIG. 5

The controller 10 in FIG. 1 can also operate according to the new control method shown in FIG. 5. The following is a description of the control system shown in FIG. 1 operating according to the new control method shown in FIG. 5. Desired value 85 and desired direction of adjustment 90 are used by controller 10 to determine control signal 40. If desired value 85 cannot be achieved as a result of manipulator 15 adjusting from reset value 95 in desired direction of adjustment 90 then controller 10 produces control signal 40 to adjust manipulator 15 to achieve reset value 95. If desired value 85 can be achieved as a result of manipulator 15 starting at reset value 95 and adjusting in the desired direction of adjustment 90 then controller 10 produces control signal 40 to adjust manipulator 15 so that desired value 85 is achieved. When the new control method as outlined in FIG. 5 is applied to the control system shown in FIG. 1, as described above, then system variable 50 achieves desired value 85 as a result of manipulator 15 adjusting from reset value 95 in the desired direction of adjustment 90.

Conclusion, Ramifications, and Scope

Accordingly, the reader will see that this new control method can be used to control any system variable without the need for random, periodic, or position based resetting of the manipulator. The new control method can be applied to various systems to cause various system variables to achieve a desired value as a result of the manipulator being adjusted corresponding to a desired direction of adjustment. Many different control systems and control routines can be modified to operate according to the new control method. While the description above contains many specifications, these should not be construed as limitations on the scope of this invention, but rather as an exemplification of one preferred embodiment thereof. Many other variations are possible. For example:

the control method can be applied to control systems that have additional elements such as additional sensors, additional control elements, additional input and output values;

the control method can be executed by any style controller including a microprocessor based controller, an electric or electronic controller, a controller consisting of relay and timer devices, a mechanical controller, or other;

the control method can be executed by a controller that performs many other operations and executes many other control methods and functions;

the control method can be applied to control systems that use any type of communication between various parts of the system, including any network communication by any means, and direct communication, or signaling by any means;

the control method can be applied to control systems that use any type of communication to interface to entities outside of the control system including any network communication by any means, and direct communication or signaling by any means;

the controller can use a means other than direct input to establish values for the desired value, the reset value, or the desired direction of adjustment such as, calculating the values based on other input values, establishing the desired direction of adjustment based on the adjustment necessary to achieve the desired value from the reset value, or any other means;

the system variable being controlled can be a variable that describes a characteristic or value of the manipulator;

the controller can further restrict allowable manipulator adjustments in the desired direction of adjustment to manipulator adjustments that start with the manipulator at the reset value and continue until the desired value is achieved;

the speed at which the manipulator adjusts can be constant or can vary based on one or more system variables, or other factors; and the control method can be applied to systems that include incremental control type manipulators, final control elements, and actuators, as well as other types of manipulators, final control elements, and actuators.

Accordingly, the scope of the invention should be determined not by the embodiments illustrated, but by the appended claims and their legal equivalents.

I claim:

1. A method of controlling the operation of a manipulator that is part of a control system where said control system adjusts said manipulator to cause a system variable to achieve a desired value, said method of controlling comprising the steps of:

a. selecting said desired value for said system variable prior to manipulator adjustment, b. selecting a desired direction of adjustment for said manipulator prior to said manipulator adjustment, c. selecting a reset value for said manipulator from which said manipulator can adjust in said desired direction of adjustment to cause said system variable to achieve said desired value, d. forbidding said manipulator to adjust contrary to said desired direction of adjustment except when said manipulator is being adjusted to achieve said reset value, e. adjusting said manipulator to achieve said reset value when said manipulator needs to be adjusted contrary to said desired direction of adjustment in order to enable said control system to cause said system variable to achieve said desired value, and f. allowing said control system to adjust said manipulator in said desired direction of adjustment so that said system variable achieves said desired value as a direct result of said manipulator adjusting in said desired direction of adjustment.

2. The method of claim 1 wherein said manipulator is an incremental control type actuator.

3. The method of claim 1 wherein said reset value is a value at an extreme end of said manipulator's range of possible values.

4. The method of claim 1 wherein allowable manipulator adjustments in said desired direction of adjustment are further restricted to adjustments that start with said manipulator at said reset value and continue until said desired value is achieved, whereby said system variable achieves said desired value as a result of said manipulator adjusting from said reset value using adjustments in said desired direction of adjustment.

5. The method of claim 1 wherein a controller positions said manipulator which is an incremental control type actuator that positions a damper, said desired direction of adjustment is chosen to be the open direction, said system variable is the position of said damper, said desired value is achieved when said position of said damper equals said desired value and said method of controlling comprises the steps of:

a. closing said damper to said reset value when said damper has opened beyond said desired value, b. forbidding said damper to close except when said damper closes to said reset value, c. opening said damper to said desired value when said position of said damper is less open than said desired value, whereby said damper achieves said desired value as a final result of said damper opening and not as a final result of said damper closing.

6. The method of claim 5 where forbidding said damper to close except when said damper closes to said reset value is accomplished by said controller controlling a control signal that positions said damper.

7. The method of claim 5 where forbidding said damper to close except when said damper closes to said reset value is accomplished by said manipulator controlling said damper.

* * * * *